United States Patent [19]
Wong et al.

[11] Patent Number: 5,942,275
[45] Date of Patent: *Aug. 24, 1999

[54] FLAVORED NUT SPREADS HAVING MILK CHOCOLATE FLAVOR AND CREAMY SOFT TEXTURE

[75] Inventors: Vincent York-Leung Wong, Hamilton; Michael Charles Schmidt, Reading; Jing Chen, West Chester; David Joseph Bruno, Jr., Hamilton, all of Ohio

[73] Assignee: The Procter & Gamble Company, Cincinnati, Ohio

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/958,351

[22] Filed: Oct. 27, 1997

[51] Int. Cl.$^6$ ........................................ A23L 1/38
[52] U.S. Cl. ........................... 426/631; 426/633; 426/654
[58] Field of Search ............... 426/98, 631, 632, 426/633, 654, 613

[56] References Cited

U.S. PATENT DOCUMENTS

| | | | |
|---|---|---|---|
| H1395 | 1/1995 | Prosser | 426/633 |
| H1636 | 3/1997 | Sevenants et al. | 426/633 |
| 2,780,549 | 2/1957 | Bloch | 99/126 |
| 3,978,246 | 8/1976 | Chozianin et al. | 426/633 |
| 4,363,967 | 12/1982 | Black | 426/632 |
| 4,477,482 | 10/1984 | Avera | 426/632 |
| 4,504,513 | 3/1985 | Black | 426/632 |
| 4,728,526 | 3/1988 | Avera | 426/633 |
| 4,832,977 | 5/1989 | Avera | 426/633 |
| 5,079,027 | 1/1992 | Wong et al. | 426/633 |
| 5,120,566 | 6/1992 | Baba et al. | 426/631 |
| 5,230,919 | 7/1993 | Walling et al. | 426/633 |
| 5,240,734 | 8/1993 | Izzo et al. | 426/633 |
| 5,403,601 | 4/1995 | Komai et al. | 426/98 |
| 5,417,999 | 5/1995 | Cammarn et al. | 426/633 |
| 5,433,970 | 7/1995 | Wong et al. | 426/633 |
| 5,490,999 | 2/1996 | Villagran et al. | 426/633 |
| 5,505,982 | 4/1996 | Krawczyk et al. | 426/660 |
| 5,518,755 | 5/1996 | Wong et al. | 426/633 |
| 5,520,950 | 5/1996 | Rosenplenter | 426/660 |
| 5,560,955 | 10/1996 | Izzo et al. | 426/633 |
| 5,585,135 | 12/1996 | Patterson et al. | 426/660 |

FOREIGN PATENT DOCUMENTS

| | | |
|---|---|---|
| 2 604 865 | 4/1988 | France . |
| 23 45 045 | 7/1975 | Germany . |

OTHER PUBLICATIONS

Patent Abstracts of Japan JP 59 014752, Morinaga Seika KK, Jan. 25, 1984.

*Primary Examiner*—Nina Bhat
*Attorney, Agent, or Firm*—Gerry S. Gressel; Melody A. Jones; Karen F. Clark

[57] ABSTRACT

Chocolate flavored nut spreads, especially chocolate flavored peanut butters having a milk chocolate like flavor without a bitter aftertaste and with desirable spreadability. Cocoa solids substantially free of dairy solids that are encapsulated by sugar are dispersed substantially homogeneously throughout the spread. The level of cocoa butter is also below the point where it can crystallize out (i.e., typically about 20% or less on a total fat basis).

12 Claims, No Drawings

FLAVORED NUT SPREADS HAVING MILK CHOCOLATE FLAVOR AND CREAMY SOFT TEXTURE

TECHNICAL FIELD

This application relates to flavored nut butters, especially peanut butters, having milk chocolate flavor without the use of dairy solids. This application particularly relates to chocolate flavored nut butters that have a creamy soft texture.

BACKGROUND OF THE INVENTION

Conventional peanut butter and other nut butters typically comprise cohesive, comminuted mixtures of solid nut particles suspended in oil (nut paste), a sweetener such as sugar, high fructose corn syrup or honey, salt and a stabilizing agent (e.g., a high melting point fat or hardstock) to prevent separation of the oil and particulates. The primary component of peanut butter, peanut paste, is formed by roasting, blanching, and grinding shelled peanuts. During the grinding step, the cellular structure of the peanuts is ruptured, releasing the peanut oil in which the pulverized peanut solids become suspended.

Chocolate can be an especially complimentary flavor to peanut flavor and is often used to enrobe peanut flavored centers or nougats or to form an exterior cup that is then filled with peanut flavored material. Indeed, the concept of flavoring nut butters and especially peanut butter with chocolate flavored bits is know in the art. See, for example, U.S. Pat. No. 5,079,027 (Wong et al), issued Jan. 7, 1992, which discloses adding chocolate chips or other flavored bits to peanut butter.

Making a desirable chocolate flavored peanut butter is not as simple as adding chocolate to peanut butter. Peanut butter has a very strong flavor. In order to ensure that the chocolate flavor is not overwhelmed by the peanut flavor, a very high level of chocolate is needed. At high levels of chocolate, the cocoa butter level in the spread becomes high enough that it can crystallize into a network that can stiffen the product, resulting in poor spread ability. At lower cocoa butter levels, it has been found that the network cannot form but the cocoa butter can still form fat crystalline nodules that leave the product with a mottled and unappealing appearance. Indeed, the problem with having appreciable levels of cocoa butter in peanut butter is that tempering conditions favorable for crystallizing the nut butter stabilizer are also highly favorable for causing the cocoa butter to crystallize out as a solid fat.

Cocoa powder or chocolate liquor can be used in these spreads to decrease the level of cocoa butter. However, using cocoa powder or chocolate liquor alone imparts a high level of bitterness that cannot be masked by the addition of other materials, including dairy solids. Consumers prefer a chocolate flavor that has a milk chocolate character since it is less bitter. This is typically achieved by including dairy solids in the chocolate formulation. However, it is preferred not to have dairy solids in peanut butter formulations because they can negatively impact the viscosity of the spread and because of the need to eventually flush such dairy solids out of the processing system with hot water to meet Kosher standards. The presence of water in a protein rich a peanut butter plant processing line is undesirable because it causes potential microbiological problems.

Accordingly, it would be desirable to be able to formulate a chocolate flavored peanut butter that has: (1) good spreadability; (2) without bitterness; and (3) a milk chocolate-like flavor without dairy solids.

DISCLOSURE OF THE INVENTION

The present invention relates to chocolate flavored nut spreads, and especially chocolate flavored peanut butters. These chocolate flavored nut spreads have from about 30 to about 60% total fat and a spreadability value of from about 500 to about 1400 gram force, and comprise:

a. a flavor enhancing amount of cocoa solids substantially free of dairy solids that are encapsulated by sugar and dispersed substantially homogeneously throughout the spread;

b. from about 10 to about 40% nut solids;

c. the level of cocoa butter, based on the total fat, in the spread being below the point where the cocoa butter can crystallize out as a solid fat;

d. from about 15 to about 50% sugar.

Surprisingly, the chocolate flavored nut spreads of the present invention provide a milk chocolate like-flavor without the use of dairy solids and without the bitterness typically associated with adding cocoa powder or chocolate liquor to the nut spread. This is believed to be due to encapsulating the cocoa solids with sugar before incorporation into the nut spread. These milk chocolate flavored nut spreads also have a high degree of spreadability and oil stability, even at relatively low fat contents. This achieved by crystallizing only the nut butter stabilizers to prevent oil separation and not the cocoa butter that stiffens spread and decreases its spreadability. In particular, cocoa butter crystallization is prevented by keeping its level below the point where the cocoa butter can crystallize out as a solid fat, e.g., typically at about 20% or lower on a total fat basis.

DETAILED DESCRIPTION OF THE INVENTION

A. Definitions

As used herein, the term "nut spread" means a spreadable food product made primarily from nut solids and fat/oil, plus other ingredients such as nut butter stabilizers, flavorants, bulking agents, emulsifiers, etc. Nut spreads include, but are not limited to, "nut butters" and "peanut butters" as these terms are defined by the standards of identity of the Food and Drug Administration.

As used herein, the term "total fat" refers to the total amount of fat and oil present in the nut spread. The term "fat" usually refers to triglycerides (and their corresponding substitutes) that are solid or plastic at ambient temperature, while the term "oil" usually refers to triglycerides (and their corresponding substitutes) that are liquid or fluid at ambient temperature.

B. Nut Solids-Containing Mixtures

A key component in preparing the chocolate flavored-nut spreads of the present invention is a nut solids-containing mixture The composition of these nut solids-containing mixtures can be the same or similar in composition to conventional nut spreads and nut butters well known in the art or can have a different composition. For example, one potential difference for the nut solids-containing mixtures of the present invention is that they can comprise a higher level of sugar than would typically be found in conventional nut spreads and nut butters. The nut solids-containing mixtures according to the present invention can even comprise essentially a nut paste, with all of the sugar and other ingredients (e.g., salt, emulsifier, nut butter stabilizer) being delivered by the fluid suspension. Indeed, the composition of the nut solids-containing mixture typically depends on what ingredients, and levels of those ingredients, are provided by the fluid suspension.

A primary ingredient of the nut solids-containing mixture according to the present invention is nut solids derived from nuts and oil seeds. While the present invention will be often be described in terms of nut solids derived from peanuts, it should be understood that other sources of nut solids such as almonds, pecans, walnuts, cashews, filberts, macadamia nuts, Brazilians, hazel nuts, sunflower seeds, sesame seeds, pumpkin seeds and soybeans can be used as well. Mixtures of these nut solids can also be used.

The flavor of the nut paste can be that of the natural (raw) nut or is more typically developed by subjecting the nuts to a thermal operation, usually roasting. For example, peanuts can be roasted in a hot air convection roaster (e.g., a Jet Zone roaster manufactured by Wolverine). The flavor character and intensity are controlled by the roast temperature and the roast time.

Generally, roasting peanuts at a higher roast temperature and shorter time has resulted in the most desirable peanut flavor. However, there is a limit to the amount of peanut flavor that can be developed by this approach. Roasting peanuts at higher temperatures cause a non-uniform temperature profile and in turn a non-uniform flavor profile within the peanut. It is this non-uniformity in flavor (darker roast outside and lighter roast inside) that creates a more desirable peanut flavor relative to peanuts roasted to the same color but at a lower roast temperature. However, because of the non-uniform roasting profile within the peanut, roasting to a darker roast color to further intensify peanut flavor can cause over-roasting of the outer peanut to occur, leading to burnt notes.

A way to intensify peanut flavor while minimizing burnt notes caused by over-roasting is to combine peanuts roasted separately to various roast colors. A combination of light and dark roasted peanuts results in a more intense and preferred peanut flavor character. The combination of a light and dark roast fraction simulates the flavor profile developed within a peanut that is roasted at high roast temperatures. This flavor profile can be easily manipulated by varying the proportion of peanuts roasted to different roast colors. Moreover, peanut flavor perception can also be manipulated by controlling the grind size of the various roasted peanut fractions. For example, peanuts roasted to a darker roast color can be milled to a very fine particle size without losing flavor because of the low volatility of the flavors generated during roasting. Conversely, peanuts roasted to a lighter color should preferably be milled to a larger particle size because of the high volatility of the flavors generated during roasting.

The nut solids-containing mixtures according to the prevent invention comprise from about 25 to about 50% nut solids, preferably from about 30 to about 45% nut solids. These nut solids are typically dispersed or suspended in oil derived from the respective nut that is commonly referred to as a "nut paste." The oil used in the nut spreads is typically that which naturally comes from the nut or seed during the formation of the nut paste. However, oils such as soybean oil, palm oil, cottonseed oil, coconut oil, walnut oil and other suitable edible oils can also be used, in whole or in part, in making the nut spreads of the present invention. Preferably, peanut oil expressed during formation of the peanut paste is the primary oil used in making peanut butters according to the present invention. For nut spreads made from other nuts and oil seeds, such as the sunflower seeds, mixtures of oils can be preferred for flavor. Low calorie and zero calorie fat and oil substitutes (as previously described) can also be used.

The nut paste can be made by comminuting nuts using any conventional grinder such as Bauer mill, Urschel or Fitzmill that provides an oil continuous suspension and reduces the viscosity of the paste, but does not excessively strip nut flavor volatiles. The total fat present (obtained during comminution of the nuts or by separate fat/oil addition) in the nut solids-containing mixture of the present invention can vary widely depending upon the viscosity desired, the fat level desired and like factors. Nut solids-containing mixtures of the present invention typically comprise from about 30 to about 60% total fat. Nut solids-containing mixtures of the present invention preferably comprise from about 40 to about 50% total fat.

The nut solids-containing mixtures of the present invention can also optionally comprise sugar. Typically, the nut solids-containing mixture comprises from 0 to about 25% sugar, preferably from about 3 to about 20%, most preferably from about 6 to about 15%, sugar. Suitable sugars include those previously described for the fluid suspension of sugar and liquid oil The nut solids-containing mixtures of the present invention can also comprise salt or salt substitutes such as sodium chloride, potassium chloride, sodium chloride/potassium chloride mixtures, and seasoned salts. The level of salt or salt substitute used is a matter of the desired taste level, but usually is from about 0.1 to about 2%, preferably from about 0.5 to about 1.5%, of the nut solids-containing mixture.

The nut solids-containing mixtures of the present invention can also comprise from about 0.01 to about 0.02% citric acid. Preferably from about 0.01 to about 0.015% citric acid is used. The addition of citric acid can enhance the roasted nut and especially the roasted peanut butter flavor and saltiness impression, thereby reducing the amount of salt required to give the resulting nuts spreads, especially peanut butters, of the present invention an acceptable flavor. The addition of citric acid, especially in the presence of a metallic ion salt, also allows the nut spread to achieve oxidative stability through chelation of the metal ions by the citric acid.

Water soluble bulking agents can also be used in the nut solids-containing mixtures of the present invention. These bulking agents typically add body or texture to the spread and can be non-nutritive or low calorie materials. Suitable bulling agents include corn syrup solids, maltodextrin, dextrose, polydextrose, mono- and disaccharides, starches (e.g., corn, potato, tapioca wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541 (Mazur), issued Aug. 20, 1991.

Like the fluid suspension, in order to minimize grittiness, the water-soluble solids in these nut solids-containing mixtures such as the sugar, salt and the like preferably have a relatively fine particle size. Typically, the water-soluble solids have a mean particle size of from about 20 microns or less (as measured by a laser particle size analyzer such as Malvern laser) with at least about 90% of the particles having a particle size of about 35 microns or less.

The nut solids-containing mixtures of the present invention can comprise solids other than nut solids and water soluble solids, typically in combined amounts of up to about 10%, preferably up to about 5%. These other solids can include fiber, such as cellulose, flours (e.g., wheat, rye, pea) and protein supplements such as additional peanut solids, soy flour, soy concentrate, soy isolate, casein, egg whites, and protein from other animal or vegetable sources; or any combination thereof.

The nut solids-containing mixtures of the present invention can also optionally but preferably comprise a nut butter stabilizer in effective amounts up to about 5%. Preferably from about 1 to about 3% nut butter stabilizer is used. These nut butter stabilizers can be any of the known peanut butter stabilizers, for example, hydrogenated rapeseed oil, or other hydrogenated triglycerides having a high proportion of $C_{20}$ and $C_{22}$ fatty acids. See for example, U.S. Pat. No. 3,265,507 (Japikse), issued Aug. 9, 1966 and U.S. Pat. No. 3,129,102 (Sanders), issued Apr. 14, 1964), which are incorporated by reference. These stabilizers are usually triglycerides that are solid at room temperature. They solidify in the nut spread in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil, and similar materials. This stabilizer can also be mixed with lower melting fat fractions as, for example, the peanut butter stabilizer composition disclosed in U.S. Pat. No. 4,341,814 (McCoy), issued Jul. 27, 1982, which is incorporated by reference.

Particularly suitable nut butter stabilizers for use in the nut solids-containing mixtures of the present invention include tailored β' stable hardstocks referred to as "PSP/PSS" hardstocks, as disclosed in U.S. Pat. No. 4,996,074 (Seiden et al), issued Feb. 26, 1991, which is incorporated herein by reference. Highly hydrogenated high erucic acid rapeseed oil shown in Example VI of this patent is an example of a β' tending hardstock particularly suitable for use in combination with the PSP/PSS hardstock. When the PSP/PSS hardstock is used in combination with highly hydrogenated (Iodine Value less than 20, preferably less than 10) high erucic acid (preferably at least about 40%) rapeseed oil, it should be used in ratios of PSP/PSS hardstock: high erucic acid rapeseed oil of from about 30:1 to about 10:1, preferably from about 27:1 to about 20:1. The high erucic acid rapeseed oil is more fully discussed in this patent at column 7, line 50 to column 8, line 14.

Emulsifiers can also be used in the nut solids-containing mixtures of the present invention to achieve proper texture. The emulsifier can be any food compatible emulsifier such as mono- and di-glycerides, lecithin, sucrose monoesters, polyglycerol esters, sorbitan esters, polyethoxylated glycols and mixtures thereof. Up to about 5% and, preferably from about 0.01 to about 3% emulsifier is used. Additionally, the selection of certain emulsifiers such as sorbitan monostearate and preferably sorbitan tristearate can impede or prevent the cocoa butter the chocolate source from crystallizing into fat nodules. For example, adding 1% sorbitan tristearate is effective in preventing the cocoa butter in the chocolate from crystallizing into these fat nodules after the chocolate is blended with the nut solids-containing mixture.

B. Chocolate

Another key component of the nut spreads of the present invention is a particular source of chocolate. It has been found that the addition of cocoa powder or chocolate liquor to nut spreads such as peanut butter imparts a bitter flavor quality to the nut spread. Conversely, it has been found that chocolate in the form of an intimate mixture of cocoa solids and sugar such that the sugar solids encapsulate or enrobe these cocoa solids avoids imparting a bitter aftertaste to the nut spreads. In addition, the chocolate flavor character that is imparted is more like a milk chocolate flavor even though the chocolate is substantially free of dairy solids. As used herein, the term "substantially free of dairy solids" means that dairy solids are not intentionally added to the chocolate. Chocolates useful in the present invention typically comprise about 1% or less dairy solids and preferably about 0.5% or less dairy solids Chocolate useful in the present invention can be formulated from a mixture comprising chocolate liquor and/or cocoa powder and sugar. In the case of chocolate liquor, the ratio of sugar to liquor is typically in the range of from about 30:70 to about 70:30, preferably from about 40:60 to about 60:40. In the case of cocoa powder, a fat or oil other than cocoa butter is usually included in addition to the sugar. Typically such mixtures comprise from about 15 to about 40% cocoa powder, from about 15 to about 35% fat/oil and from about 40 to about 70% sugar, preferably from about 20 to about 30% cocoa powder, from about 20 to about 30% fat/oil and from about 40 to about 60% sugar. Other confectionery ingredients typically present in chocolate formulations such emulsifiers (e.g., lecithin), salt and the like can also be included.

After these ingredients are mixed together to provide the basic chocolate formulation, the key step is ensure that the cocoa solids are encapsulated or enrobed within the sugar. This is typically achieved by a conventional chocolate refining step where the solids in the mixture are reduced in size, in particular the sugar. Most importantly, this refining step encapsulates or enrobes the cocoa solids within the sugar. The relatively high pressures achieved during the refining step cause the sugar to become amorphous which then allows it to encapsulate or enrobe at least some of the cocoa solids. Typically, four or five water-cooled rolls, each progressively faster in speed, are used to refine the formulation. Pressure between the rolls is adjusted to achieve the desired fineness for the solids. Contact with moisture is also desirably avoided during refining. In particular, the rolls should not be cooled to or below the dewpoint of ambient air. The consistency of the chocolate formulation after refining is typically that of flakes or a powder. After refining, the chocolate formulation is typically ready for use in the present invention. For example, other conventional chocolate processing steps such as wet or dry conching, or tempering are not required. A commercially available chocolate particularly suitable for use in the present invention is a semi-sweet chocolate powder manufactured by Barry Callebaut in Montreal, Canada by roll refining a mixture of 60% sugar and 40% chocolate liquor.

D. Preparing Chocolate Flavored Nut Spreads

The chocolate flavored nut spreads of the present invention are preferably prepared by the method disclosed in copending U.S. application Ser. No. 08/958,349 to Vincent York-Leung Wong and Richard Joseph Sackenheim, filed Oct. 27, 1997 (P&G Case No. 6897). In this method, the encapsulated cocoa solids are added and blended into a fluid suspension which consists essentially of:

(1) an intimate mixture of sugar and edible liquid oil;
(2) an effective amount of an edible surfactant capable of imparting increased fluidity to the intimate mixture of sugar and oil.

Prior to addition of the encapsulated cocoa solids, the fluid suspension is heated above the melting point of cocoa butter, preferably to a temperature of at least about 150° F. (65.6° C.), and typically in the range of from about 150° to about 160° F. (from about 65.6° to about 71.1° C.). The ratio of encapsulated cocoa solids to fluid suspension can vary depending on the flavor effects desired but is typically in the range of from about 1:2 to about 1:5, and preferably in the range of from about 1:2 to about 1:3. The resulting chocolate flavored suspension is then substantially homogeneously blended with the nut spread at a ratio of fluid suspension to nut spread typically in the range of from about 40:60 to about 60:40 and preferably in the range of from about 45:55 to about 55:45.

The resulting chocolate flavored nut spreads have from about 30 to about 60, preferably from about 35 to about 50% total fat, and spreadability values of from about 500 to about 1400 gram force, preferably from about 700 to about 1200 gram force. See Analytical Methods section hereafter for how spreadability values are measured according to the present invention. In addition, these flavored spreads typically have a penetration value measured by a Precison Universal Penetrometer typically in the range of from about 250 to about 325 mm. These spread also comprise:

a. a flavor enhancing amount of cocoa solids substantially free of dairy solids that are encapsulated by sugar and dispersed substantially homogeneously throughout the spread, typically from about 1 to about 15% cocoa solids (i.e., not including the sugar);

b. from about 10 to about 40%, preferably from about 20 to about 30% nut solids;

c. a cocoa butter level, based on the total fat in the spread, below the point where the cocoa butter can crystallize out as a solid fat, typically about 20% or less, preferably about 10% or less;

d. from about 15 to about 50%, preferably from about 30 to about 40%, sugar;

e. optionally, but preferably from about 0.25 to about 3%, preferably from about 1 to about 2%, nut butter stabilizer;

f. from about 0.01 to about 5%, preferably from about 0.01 to about 1%, emulsifier;

g. other optional components typically included in nut spreads such as salt.

If desired, nut chunks, including defatted nut chunks, flavored or candied bits and other optional components can be included in the nut spreads of the present invention at various levels.

ANALYTICAL METHODS

1. Viscosity

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A 14.0 gram sample of the composition to be measured is placed in the sample cell. The sample cell is then inserted in the jacketed cell holder. To compensate for heat losses through the tubings, etc., the water temperature entering the jacketed cell holder should be a few degrees higher than the desired sample temperature of 65° C. (149° F.). After the temperature of the sample has reached 65° C. (149° F.) the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE I

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. The viscosity of compositions measured according to the present invention is at 20 rpm or 6.8 $\sec^{-1}$. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity that is equal to the slope of the line squared. The plastic viscosity is a measurement of the viscosity of the composition at an infinite shear rate. It accurately predicts the resistance to flow in pumping, moving or mixing situations. The Casson plastic viscosity is measured in poise.

The second value is the yield value that is equal to the value of the x intercept (abscissa) squared. The yield value is a measure of amount of force or shear that is necessary to get the product to start moving. The yield value is measured in dynes/$cm^2$. The relationship between the plastic viscosity and the yield value determine how the composition will behave in additional processing.

2. Spreadability Measurement Method

The spreadability of nut spreads prepared according to the present invention can be determined by a puncture test performed on a TA.XT2 Food Texture Analyzer manufactured by Texture Technologies Corp. The spreads in normal peanut butter jars are kept in a constant 70° F. (21.1° C.) room for at least 48 hours and then moved to room temperature for 30 minutes before measurements were made. The test involves penetrating the spread in jars with a cone shaped probe at a constant speed. A stainless steel cone with 150° angle and 22.5 mm diameter is used. The penetration speed is 3.5 mm/s, while the penetration depth is 50 mm. The penetration is followed by retracting the probe at the speed of 2 mm/sec. The tests are performed at room temperature. The penetration curves generated by the texture analyzer are recorded by a computer. Five force measurements (Positive Peak Force, Negative Peak Force, Positive Force Area, Negative Force Area and Force Gradient) are obtained from the penetration curve. The Positive Peak Force correlates significantly with the spreadability and is used to define the spreadability of nut spreads according to the present invention.

3. Cocoa Butter Level in Chocolate Flavored Nut Spread

The cocoa butter level in chocolated flavored nut spreads, especially chocolate flavored peanut butter, can be determined by the following method: 25 g of chocolate flavored nut spread is extracted in 100 mL of heated ethylene dichloride. Samples are washed and filtered through glass fiber filter paper to isolate the ethylene dichloride. The resulting filtrate is evaporated under nitrogen and the isolated lipid is analyzed using nonaqueous reverse phase HPLC with evaporative light scattering detection. The percentage of cocoa butter is calculated based on the percentage of 2-oleopalritostearin (POS) triglyceride present in the total triglyceride in the lipid extract. Analysis and quantitation of POS triglyceride can be carried out similar to the method described in Singleton and Pattee, "Characterization of Peanut Oil Triacylglycerols by HPLC, GLC and EIMS," JAOCS, 64, p. 534 (1987).

EXAMPLES

The following are representative examples of chocolate flavored peanut butters and spreads prepared according to the present invention.

A. Peanut Solids-Containing Mixtures

The peanut solids-containing mixture used in the following Examples is prepared from the following ingredients:

| Ingredients | % |
| --- | --- |
| Peanuts | 86.2 |
| Sugar | 10.0 |
| Salt | 1.2 |
| Molasses | 0.5 |
| Stabilizer | 1.8 |
| Emulsifier | 0.3 |

A peanut paste is prepared by roasting the peanuts at 405° F. (207.2° C.) for 4.5 minutes in a Wolverine Jet Zone roaster in order to develop the desired peanut flavor. The roasted peanuts are then discharged from the roaster and cooled to 100° F. (37.8° C.). Next, the cooled nuts are blanched and passed through a color sorter to remove nut s falling outside of the desired color target. The color sorted peanuts are converted into a flowable peanut paste by milling the nuts in a Bauer mill. The paste is then added to a 100 gallon Hamilton mix kettle where the remaining ingredients are added. After mixing at 150° F., the peanut solids-containing mixture is homogenized at 3500 psi through a APV Gaulin M-8 homgenizer and stored in a mix tank.

B. Fluid Suspension of Suger and Oil

The fluid suspension of sugar and liquid oil used in the following Examples is prepared from the following ingredients:

| Ingredients | % |
| --- | --- |
| Sugar | 57.3 |
| Peanut oil | 41.7 |
| Lecithin | 1.0 |

An Ekato mix kettle that has an anchor mixing blade and a Mizer disc is used that is fitted with a recirculation loop that allows a portion of the mixed material to be circulated through a pump and back to the mix kettle. A 400 pound batch of the fluid suspension is m ade as follows: First, 167 pounds of peanut oil is added to the mix kettle. The anchor agitator and Mizer disc are then turned on at 19 rpm and 540 rpm, respectively. The pump in the recirculation loop is also turned on to about 1500 lbs. Four pounds of lecithin is then added to the mix kettle and allowed to mix for about 5 minutes. Next, 229 pounds of 12X sugar is metered into the mix kettle at 230 lbs/hr. At the end of the sugar addition, the fluid suspension is allowed to mix for an additional 30 minutes to ensure complete mixing.

EXAMPLE 1

A chocolate flavored peanut spread is prepared as follows: A chocolate flavored fluid suspension is first prepared by mixing in a Hamilton kettle 32.84 parts of the fluid suspension described above with 15 parts of a chocolate flavor mix consisting of chocolate powder (refined mixture of 60% sugar and 40% chocolate liquor), 0.18 parts vanilla flavor, 0.19 parts salt and 0.31 parts nut butter stabilizer. The contents of the mix kettle is heated at 150° F. (65.6° C.). The viscosity of the chocolate flavored suspension is about 5500 centipoise (6.8 sec$^{-1}$). The chocolate flavored peanut spread is prepared by adding the peanut solids-containing mixture described earlier to the chocolate flavored fluid suspension in the Hamilton mix kettle in a ratio of 48.52 parts flavored fluid suspension to 51.48 parts nut solids-containing mixture. To ensure good top to bottom mixing a recirculation loop with a pump is used with the kettle. After mixing, the resultant chocolate flavored spread has a viscosity of about 3000–3500 centipoise (6.8 sec$^{-1}$). This chocolate flavored spread is then processed through a normal peanut butter finishing operation that consists of processing the spread through a Versator to remove entrained air for improving the spread's oxidative stability and then through a Votator and picker for setting up the nut butter stabilizer. The spread is packed and allowed to temper. The finished flavored spread is stable to oil separation, yet is soft and highly spreadable. The spreadability value (as measured with the Texture Analyzer) is 800 gram force. The fat content of the flavored spread is 41.5%.

EXAMPLE 2

A chocolate flavored peanut spread is prepared as follows: A chocolate flavored fluid suspension is first prepared by mixing in a Hamilton kettle 32.84 parts of the fluid suspension described above with 15 parts of a chocolate flavor mix consisting of chocolate powder (refined mixture of 60% sugar and 40% chocolate liquor), 0.18 parts vanilla flavor, 0.19 parts salt and 0.31 parts nut butter stabilizer and 0.1 parts sorbitan tristearate.. The contents of the mix kettle is heated at 150° F. (65.6° C.). The viscosity of the chocolate flavored suspension is about 5500 centipoise (6.8 sec$^{-1}$). The chocolate flavored peanut spread is prepared by adding the peanut solids-containing mixture described above to the chocolate flavored fluid suspension in the Hamilton mix kettle in a ratio of 48.52 parts flavored fluid suspension to 51.48 parts nut solids-containing mixture. To ensure good top to bottom mixing a recirculation loop with a pump is used with the kettle. After mixing, the resultant chocolate flavored spread has a viscosity of about 3000–3500 centipoise (6.8 sec$^{-1}$). This chocolate flavored spread is then processed through a normal peanut butter finishing operation that consists of processing the spread through a Versator to remove entrained air for improving the spread's oxidative stability and then through a Votator and picker for setting up the nut butter stabilizer. The spread is packed and allowed to temper. The finished flavored spread is stable to oil separation, yet is soft and highly spread able. The spreadability value (as measured with the Texture Analyzer) is 800 gram force. The fat content of the flavored spread is 41.5%.

EXAMPLE 3

A chocolate flavored peanut spread is prepared as follows: A chocolate flavored fluid suspension is first prepared by mixing in a Hamilton kettle 36.74 parts of the fluid suspension described above with II.1 parts of a chocolate flavor mix (refined mixture of 40% sugar and 30% cocoa powder (cocoa butter content of 10%), 29% partially hydrogenated soybean oil, and 1 %sorbitan monostearate), 0.18 parts vanilla flavor, 0.19 parts salt and 0.31 parts nut butter stabilizer. The contents of the mix kettle is heated at 150° F. (65.6° C.). The viscosity of the chocolate flavored suspension is about 5600 centipoise (6.8 sec$^{-1}$). The chocolate flavored peanut spread is prepared by adding the peanut solids-containing mixture described earlier to the chocolate flavored fluid suspension in the Hamilton mix kettle in a ratio of 48.52 parts flavored fluid suspension to 51.48 parts nut solids-containing mixture. To ensure good top to bottom mixing a recirculation loop with a pump is used with the kettle. After mixing, the resultant chocolate flavored spread has a viscosity of about 3000–3500 centipoise (6.8 sec$^{-1}$). This chocolate flavored spread is then processed through a normal peanut butter finishing operation that consists of processing the spread through a Versator to remove entrained air for improving the spread's oxidative stability and then through a Votator and picker for setting up the nut butter stabilizer. The spread is packed and allowed to temper. The finished flavored spread is stable to oil separation, yet is soft and highly spreadable. The spreadability value (as measured with the Texture Analyzer) is 800 gram force. The fat content of the flavored spread is 42.6%.

What is claimed is:

1. A chocolate flavored nut spread having from about 30 to about 60% total fat and a spreadability value of from about 500 to about 1400 gram force, and which comprises:
   a. a flavor enhancing amount of cocoa solids substantially free of dairy solids that are encapsulated by sugar and dispersed substantially homogeneously throughout the spread;
   b. from about 10 to about 40% nut solids;
   c. the level of cocoa butter, based on the total fat, in the spread being below the point where the cocoa butter can crystallize out as a solid fat;
   d. from about 15 to about 50% sugar.

2. The spread of claim 1 which comprises from about 1 to about 15% of the cocoa solids.

3. The spread of claim 1 which has from about 35 to about 50% total fat.

4. The spread of claim 3 which comprises from about 15 to about 35% nut solids.

5. The spread of claim 4 which comprises from about 30 to about 40% sugar.

6. The spread of claim 1 wherein the cocoa butter level is about 20% or less based on the total fat in the spread.

7. The spread of claim 5 wherein the cocoa butter level is about 10% or less based on the total fat in the spread.

8. The spread of claim 1 which further comprises:
   e. from about 0.25 to about 3% of a nut butter stabilizer;
   f. from about 0.01 to about 5% of an emulsifier.

9. The spread of claim 8 which comprises:
   e. from about 1 to about 2% of a nut butter stabilizer;
   f. from about 0.01 to about 1% of an emulsifier.

10. The spread of claim 8 wherein the emulsifier comprises sorbitan monostearate or sorbitan tristearate.

11. The spread of claim 1 which has a spreadability value of from about 700 to about 1200 gram force.

12. A chocolate flavored nut spread having from about 30 to about 60% total fat and a spreadability value of from about 500 to about 1400 gram force, and which comprises:
   a. a flavor enhancing amount of cocoa solids substantially free of dairy solids, the cocoa solids encapsulated by sugar and dispersed substantially homogeneously throughout the spread;
   b. less than about 40% nut solids;
   c. the level of cocoa butter, based on the total fat, in the spread being below the point where the cocoa butter can crystallize out as a solid fat; and
   d. greater than 15% sugar.

* * * * *